Feb. 24, 1925. 1,527,671
G. N. CONDYLES
PIE-TRIMMING AND RIMMING MACHINE
Filed Aug. 7, 1924 2 Sheets-Sheet 2

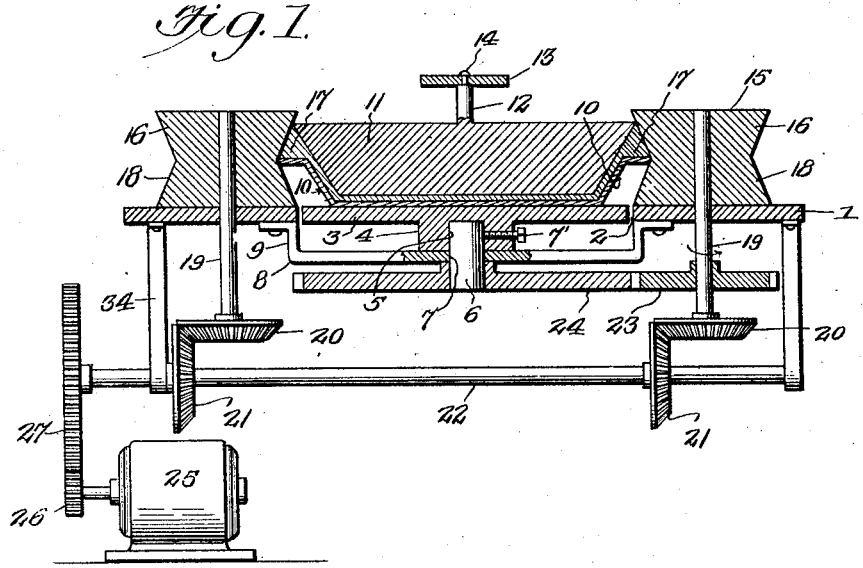

Inventor
G. N. Condyles,
By
Attorney

Patented Feb. 24, 1925.

1,527,671

UNITED STATES PATENT OFFICE.

GEORGE N. CONDYLES, OF RICHMOND, VIRGINIA.

PIE TRIMMING AND RIMMING MACHINE.

Application filed August 7, 1924. Serial No. 730,598.

*To all whom it may concern:*

Be it known that I, GEORGE N. CONDYLES, a citizen of the Greek Republic, residing at Richmond, in the county of Henrico, State of Virginia, have invented new and useful Improvements in Pie Trimming and Rimming Machines, of which the following is a specification.

This invention relates to a pie trimming and rimming machine.

The object of the present invention is to provide a simple, practical and efficient pie trimming and rimming machine of strong and durable construction adapted to enable pies to be easily and rapidly trimmed and rimmed.

A further object of the invention is to provide a machine of this character which will not be limited to pie plates of a given diameter but which will be capable of rimming and trimming the dough of pie plates of different sizes.

It is also an object of the invention to provide a pie trimming and rimming machine adapted to trim and rim the bottom crust of open pies where the fruit or other material is placed in the lower crust after the same has been rimmed and trimmed and capable also of enabling pies having a top crust to be properly trimmed.

It is also an object of the invention to provide a pie trimming and rimming machine adapted to have the pie supporting means duplicated in order that a plurality of persons may simultaneously use the machine.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Figure 1 is a vertical sectional view of a pie rimming and trimming machine constructed in accordance with this invention.

Figure 2 is a plan view of the same.

Figure 3:
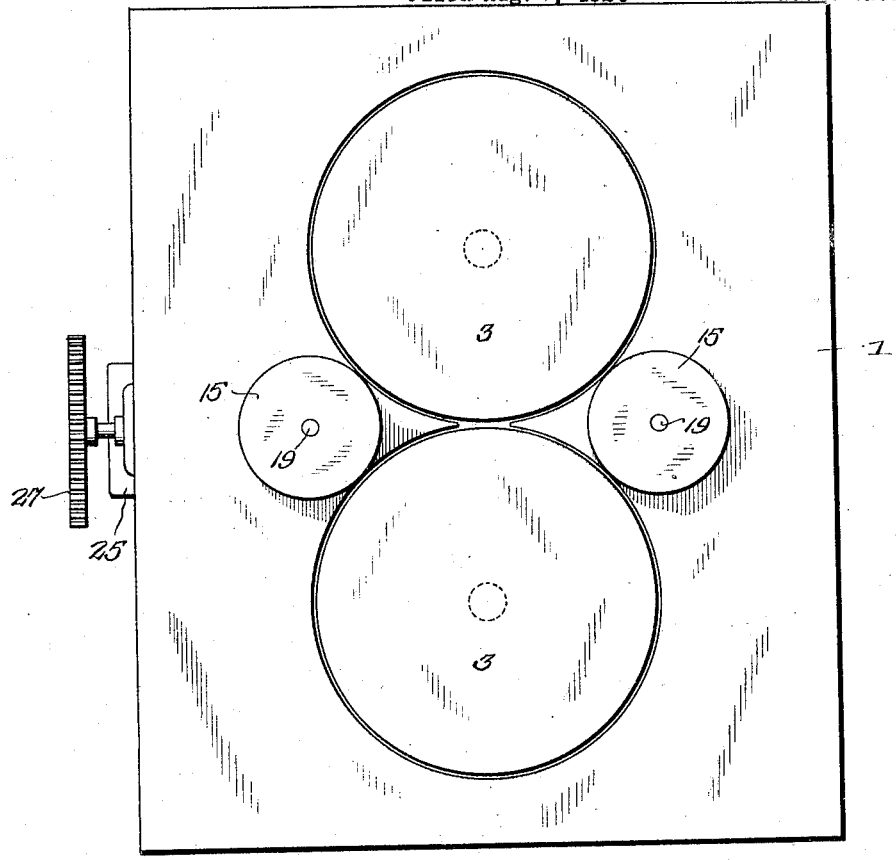
Figure 3 is a plan view illustrating a duplication of the pie supporting means for enabling two persons to use the machine simultaneously.

In the accompanying drawings in which is illustrated the preferred embodiment of the invention, the pie trimming and rimming machine comprises in its construction, a table 1 mounted and supported in any desired manner and provided with a circular opening 2 for the reception of a rotary pie plate support 3 preferably consisting of a disk, as clearly illustrated in Fig. 2 of the drawings. The rotary pie plate support which is arranged in flush relation with the upper face of the table 1 is provided at the lower face with a depending central hub portion 4 having a socket 5 for the reception of the upper end of the shaft 6 to which the hub is secured by means of a set screw 7' but any other suitable means may of course be employed for fixing the hub of the rotary pie plate support to the upper end of the shaft 6. The vertical shaft 6, which is relatively short is journalled in a central bearing 7 of a bearing bracket 8 preferably consisting of a bar of metal having its terminals bent upwardly and extending outwardly forming approximately L-shaped arms 9, which are bolted or otherwise secured to the lower face of the table 1, as clearly shown in Fig. 1 of the drawings. The bearing bracket depends below the table and extends across the circular opening 2, but of course it may be of any other desired construction as will be readily understood.

The rotary support 3 is adapted to receive a pie plate 10 over which a sheet of dough is placed in the usual manner to form the bottom crust of pie, and the pie plate is then placed upon the support 3 as illustrated in Fig. 1 of the drawing and is maintained in proper frictional engagement with the rotary support 3 by means of a holder 11 consisting when designed for open pies, of a tapered or inverted trunco-conical body and provided with a central upwardly extending stem 12 on which is loosely pivoted a handle 13. The handle 13, which may consist of a disk or be of any other desired form, is adapted to be grasped by the hand and it is pierced by a central pivot 14. The operator by means of the holder is adapted to maintain the pie plate and its sheet of dough on the support 3 and is enabled to hold the pie plate in contact with a pair of shaping rollers 15, having inverted conical upper portions 16, which cooperate with the tapered holder 11 to form a substantially triangular space 17 above the rim of the pie plate and between the holder and the shaping rollers for rimming the dough and trimming the superfluous dough from the pie plate. The shaping rollers and the pie plate support are rotated by the gearing hereinafter described and the contiguous portions of the rotary support and the rollers move in the same direction and when the pie plate with its sheet of dough is brought in contact with the shaping rollers, the dough will be lifted by the rollers and crowded into the triangular space and rimmed in a triangular form in cross section upon the rim of the pie plate. The lower portion 18 of the shaping rollers may be tapered or conical as shown or the diameter and shape may be varied to construct the rollers to suit the different diameters of pie plates designed to be used in the machine. In one aspect of the invention, the upper and lower reversely arranged conical portions of the shaping device or rollers provide the latter with a peripheral groove or recess to receive the rim of the receptacles to operate on the dough carried on the rim of the receptacles. The engagement between the pie plate and the shaping rollers as the support is rotated causes the dough to be trimmed off while the rimmed dough is built up in the said triangular form upon the pie plate. The pressure may be regulated by the operator grasping the handle 13 as will be readily understood.

The shaping rollers are mounted on vertical shafts 19 which are connected by bevelled gears 20 and 21 with a horizontal shaft 22 and one of the vertical shafts 19 is connected by horizontal spur gears 23 and 24 with the central vertical shaft 6 for positively rotating the pie plate support. The spur gear 24 is preferably approximately the diameter of the rotary pie plate support while the meshing gear 23 is of substantially the diameter of the shaping roller, and it will be clear that the vertical bevelled gears 21, by meshing with the horizontal bevelled gears 20 at the same side thereof will cause the shaping rollers to rotate in the same direction while the spur gearing will cause a reverse rotation of the pie plate support, thereby producing movement of the adjacent portions of the pie plate support and the shaping rollers in the some direction for shaping and trimming the dough.

The machine may be driven by any suitable power and in the accompanying drawings, is illustrated an electric motor 25 which is connected by spur gears 26 and 27 with the horizontal shaft 22. Any other form of gearing, however, may be employed and the gearing will in practice impart to the shaft 22, the desired speed of rotation.

The rotary pie plate support 3 may be duplicated by arranging an additional pie plate support at the opposite side of the shaping rollers 15. The gearing is the same as that heretofore described with the sole exception that the horizontal spur gearing is duplicated, one set of the gears 23 and 24 being connected with each of the vertical shafts 19 so that the rotary pie plate support 3 at each side of the shaping rollers will be positively rotated in the same manner as that heretofore described. This will enable two persons to operate the machine simultaneously one person working at one side of the table and another at the opposite side and neither will interfere with the other.

Figure 4:
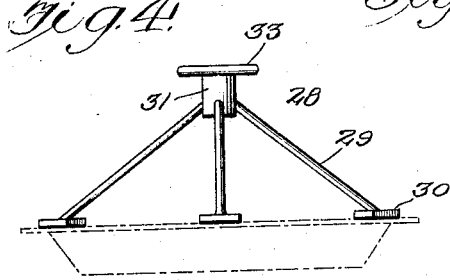
Figure 4 is an elevation of a pie holder for retaining the upper crust on the pie plate while the dough is being trimmed.
Figure 5:
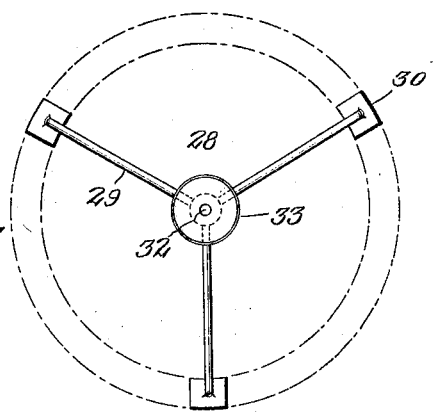
Figure 5 is a plan view of the same.

Also when it is desired to trim pies having upper and lower crusts, a pie holder 28 of the form illustrated in Figs. 4 and 5 of the drawings is employed. The pie holder 28 is provided with a plurality of arms 29 arranged at an inclination and provided at their outer ends with horizontal engaging portions 30 consisting of substantially rectangular plates presenting flat lower faces to the dough and spaced clear around the pie plate as clearly shown in Fig. 5. The arms 29 are three in number but the number may of course, be varied as will be readily understood and they are connected at their upper ends to a central hub 31, having a vertical pivot 32 on which is mounted a handle 33 consisting of a disk similar to the handle heretofore described. The pie plate holder is adapted to be placed upon the upper crust of the pie and it will enable the pie plate to be maintained upon the support and in frictional engagement with the same and with the shaping rollers for trimming the dough.

The shaping rollers are spaced apart a distance less than the diameter of the pie support and in the present machine it is not necessary that the pie plate be of the same diameter as the space between the shaping rollers but on the contrary, the pie plates are of greater diameter than the space between the shaping rollers and pie plates of various sizes may be used in the machine with equal facility. In the operation of the machine, the sheet of dough is placed in the pie plate and the holder 11 is placed within the pie plate upon the dough if the pie is to be an open pie which is filled after the trimming and rimming. The pie plate with its sheet of dough and holder is then placed upon the support and moved over the same to a position contiguous to the shaping rollers and it is held in such position until the rim of the lower crust is built up upon the rim of the pie plate and the excess dough trimmed from the pie plate. The height of the rim is dependent on the size of the body 11 and the distance it projects above the pie plate in conjunction with the size and shape of the shaping rollers. This determines the size of the space 17 and the consequent size and shape of the built up rim of the lower crust. The lower portion of the shaping roller picks up the hanging dough and lifts and feeds the same to the space 17 and the rotary movement of the shaping rollers and the pie plate rapidly and accurately rims and trims the dough and produces an artistic and uniform lower pie crust. The trimming of a pie having an upper crust is performed in a similar manner with the exception that the pie holder illustrated in Figs. 4 and 5 is used. While the rotary pie support is shown duplicated in Fig. 3 of the drawings, it will be readily understood that the shaping rollers and the rotary pie plate support may be duplicated to provide a machine for accommodating any desired number of operators. The horizontal shaft is hung from the table in suitable hangers 34 but may be mounted in any other desired manner.

What is claimed is:

1. A machine of the class described including a rotary support adapted to receive a receptacle having the dough to be shaped and trimmed and a rotary shaping roller cooperating with the rotary support and grooved to receive the rim of the receptacle and adapted to operate on the dough carried by the same.

2. A machine of the class described including a rotary support adapted to receive a receptacle having the dough to be shaped and trimmed, a rotary shaping roller arranged adjacent the rotary support and grooved to receive the rim of the said receptacle and to operate on the dough carried by the same, and a shaping device arranged within the receptacle and cooperating with the shaping roller for shaping the dough between it and the said roller.

3. A machine of the class described including a rotary support adapted to receive a receptacle having the dough to be shaped and trimmed, a rotary shaping roller arranged adjacent the rotary support and grooved to receive the rim of the said receptacle and to operate on the dough carried by the same, and a holder arranged within the receptacle and provided with means cooperating with the said shaping roller for shaping the dough between it and the said roller.

4. A machine of the class described including a rotary support adapted to receive a receptacle having the dough to be shaped and trimmed, a rotary shaping roller arranged adjacent the rotary support and grooved to receive the rim of the said receptacle and to operate on the dough carried by the same, and a holder arranged within the receptacle and provided with means cooperating with the said shaping roller for shaping the dough between it and the said roller, said holder having a handle having a pivotal connection with the holder to permit the handle to be grasped while the holder is rotating with the receptacle and the support.

5. A machine of the class described including a rotary support adapted to receive a receptacle having the dough to be shaped and trimmed, a rotary shaping roller arranged adjacent the rotary support and grooved to receive the rim of the said receptacle and to operate on the dough carried by the same, and a holder arranged on the receptacle for holding the same against the support and in contact with the shaping roller, said holder having its peripheral edge operating in the groove of the roller and being provided with a handle having a pivotal connection with the holder to permit the latter to be grasped by the operator while the holder and the support are rotating.

6. A machine of the class described including a rotary support adapted to receive a receptacle with the dough to be shaped and trimmed, vertically disposed spaced shaping rollers of a diameter less than the rotary support located at one side thereof and grooved to receive the edge of the receptacle to provide shaping upper portions projecting above the receptacle, and a holder fitting the receptacle and having an upwardly projecting shaping portion cooperating with the upper portion of the grooves of the shaping rollers and forming with the same, a shaping space above the rim of the receptacle.

7. A machine of the class described including a shaping roller having reversely arranged conical upper and lower portions, and means for supporting and rotating a receptacle while the same is presented to the shaping roller.

8. A machine of the class described including spaced grooved shaping rollers spaced apart a distance less than the diameter of the receptacle to permit the edges of receptacles of different diameters to be presented to and received in the grooves of the shaping rollers, and means for supporting and rotating the receptacle while the same is presented to the shaping rollers.

9. A machine of the class described including a table having an opening, a rotary circular support adapted to receive a receptacle and the dough to be shaped and trimmed, spaced shaping rollers located above the table adjacent the said rotary support and having shaping portions adapted to shape and trim dough on a receptacle carried by the rotary support, vertical shafts carrying the shaping rollers and a rotary support, a horizontal shaft located beneath the table similarly arranged gears connecting the shafts of the shaping rollers with the horizontal shaft and a set of gears connecting one of the shafts of the shaping rollers with the shaft of the rotary support.

10. A machine of the class described including a table having an opening, a bearing bracket extending across the opening and located beneath the table, a disk forming a rotary support and having a vertical shaft mounted in the bearing bracket, shaping rollers located above the table and provided with shafts extending below the same, gearing connected with the shafts of the shaping rollers for rotating the latter and gearing for transmitting motion to the shaft of the rotary support.

11. A machine of the class described including shaping devices spaced apart for the disposition between them of receptacles containing the dough to be shaped and trimmed, the shaping devices each having a groove to receive the marginal edges of the receptacle, whereby receptacles of different diameters may be presented to the shaping devices, and means for supporting and rotating the receptacle in cooperative relation with the shaping devices.

12. A machine of the class described including a rotary support adapted to receive a receptacle having the dough to be shaped and trimmed, and a rotary shaping device rotatable outside the area of the rotary support and extending above and below the receptacle and having portions operating over and under the rim of the receptacle to operate on the dough carried on the rim of the receptacle.

13. A machine of the character described including a table having openings therein, a rotary circular support mounted in each opening adapted to receive a receptacle and the dough to be shaped and trimmed, spaced shaping rollers located above the table adjacent the said rotary supports between the latter and having shaping portions adapted to shape and trim dough on receptacles carried by the supports, and a holder arranged within each receptacle and cooperating with said shaping rollers for shaping the dough carried on the rims of the receptacles.

In testimony whereof I have hereunto set my hand.

GEORGE N. CONDYLES.